Figure 1:
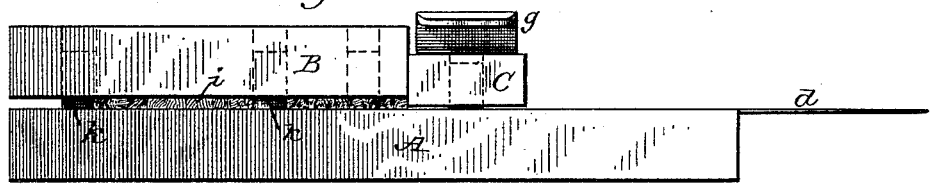

(No Model.) 2 Sheets—Sheet 1.

A. C. ESTABROOK.
DIE FOR MOLDING COMPOSITION HANDLES.

No. 394,107. Patented Dec. 4, 1888.

Attest:
Philip F. Larner.
Howell Bartle.

Inventor:
Alanson C. Estabrook.
By
Attorney.

(No Model.) 2 Sheets—Sheet 2.
A. C. ESTABROOK.
DIE FOR MOLDING COMPOSITION HANDLES.
No. 394,107. Patented Dec. 4, 1888.
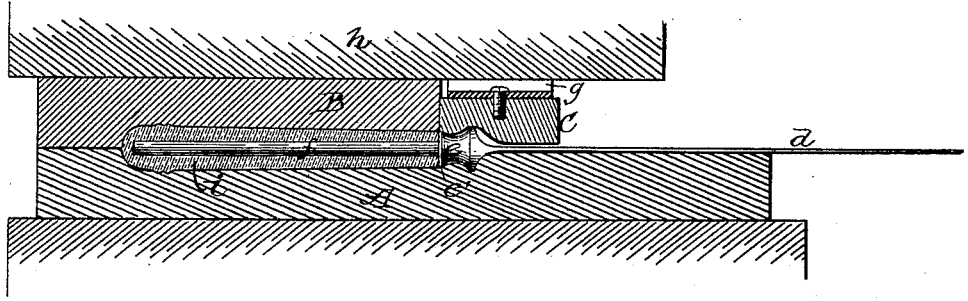
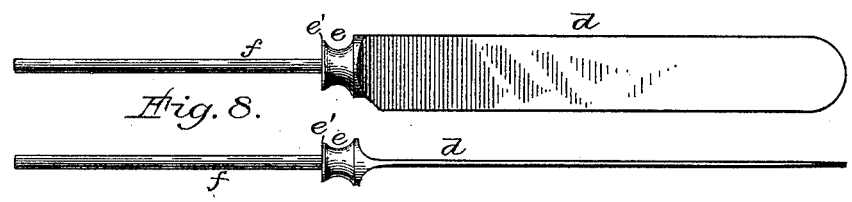
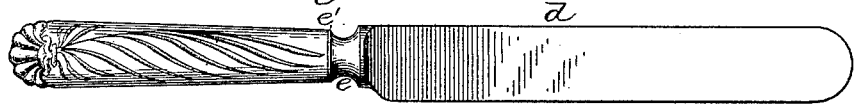
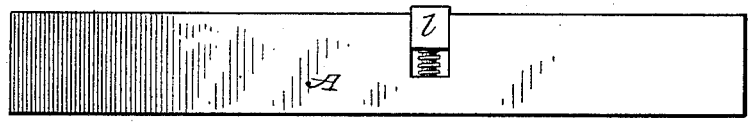
Attest:
Philip F. Larner
Howell Bartle
Inventor:
Alanson C. Estabrook
By M. C. Clifford
Attorney

UNITED STATES PATENT OFFICE.

ALANSON C. ESTABROOK, OF NORTHAMPTON, ASSIGNOR TO THE FLORENCE MANUFACTURING COMPANY, OF FLORENCE, MASSACHUSETTS.

DIE FOR MOLDING COMPOSITION HANDLES.

SPECIFICATION forming part of Letters Patent No. 394,107, dated December 4, 1888.

Application filed October 2, 1888. Serial No. 287,021. (No model.)

*To all whom it may concern:*

Be it known that I, ALANSON C. ESTABROOK, of Northampton, in the county of Hampshire and State of Massachusetts, have invented certain new and useful Improvements in Dies for Molding Composition Handles on Table Knives, Forks, and Similar Articles; and I do hereby declare that the following specifiation, taken in connection with the drawings furnished and forming a part of the same, is a clear, true, and complete description of my invention.

The object of my invention is a molding-die, by means of which table knives, forks, and similar articles may be provided with handles composed of such semi-plastic compositions as require comparatively high temperatures, heavy pressure, and subsequent cooling for developing them into a reliable condition as to strength and also as to finish, and a capacity for resisting the destructive or impairing influences of hot and cold water. In other words, the character of the compositions which my die-molds are intended to work upon are stiff and sluggish, even when hot, and totally incapable of being forced into a clamped mold, as has heretofore been proposed in the manufacture of celluloid handles, the celluloid composition being in a semi-fluid condition, so as to allow of its being forced from a mass of the celluloid under pressure through a duct entering at the end of the mold or cavity within which the handle is formed; and hence said molds are incapable of use with such compositions as are used by me. My dies are constructed in parts, mainly a base, a main cap, and a shut-off cap; but the die is fully opened for the reception of the semi-plastic compound in proper quantity and in two separate charges or portions, and then the parts are put together and the die subjected to heavy pressure in a press for thoroughly solidifying the compound, none of which can escape from the handle-matrix, except in the form of occasional thin webs or fins, which are subsequently removed from the handle in finishing. It is essential that the forward displacement of the composition in the die should be quite fully arrested by the bolster of the knife, and also that a fine neat finish should be secured at the junction of the composition with the thin rear edge of the bolster, and therefore at the front end of the handle-matrix there is a bolster-seat which is so shaped as to form a close union with the periphery of a bolster at or near its rear edge. For enabling the tang of a knife or fork to be promptly located properly in the handle-matrix of the die, the base has beyond its bolster-seat a bearing-seat appropriately formed to receive either the blade of a knife flatwise, or the shank of a steel fork, for instance, so that when the lower portion of the composition has been first placed in the matrix the tang can be accurately located in the composition by pressing the blade or a fork-shank to its seat by hand. The shut-off cap has a partial bolster-seat, which overlies a corresponding portion of the bolster-seat in the base piece, and said cap is arranged to operate initially with yielding pressure in clamping the bolster somewhat in advance of the compression of the plastic matter between the main cap and the base-piece, and it therefore shuts off or prevents the flow of the compressed composition from the matrix over the edge of the bolster.

To more particularly describe my invention, I will refer to the accompanying drawings, in which—

Figure 2:
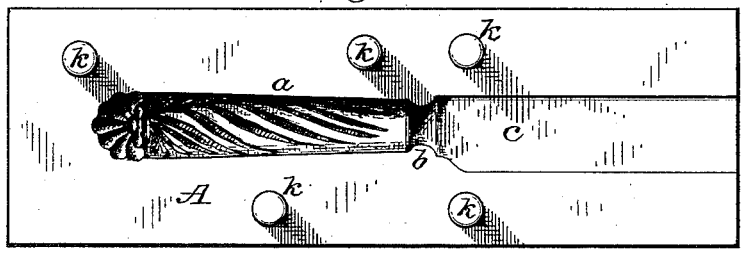
Figure 4:
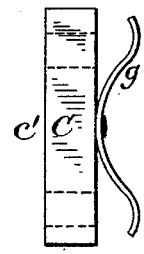
Figure 3:
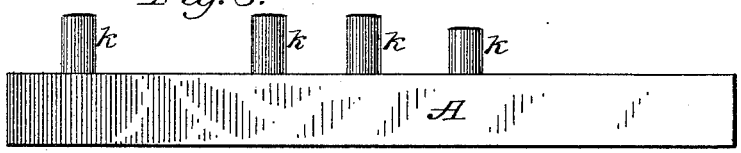
Figure 5:
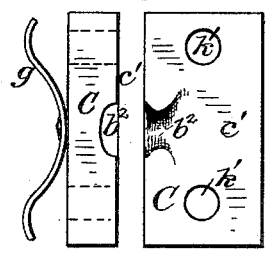
Figure 6:
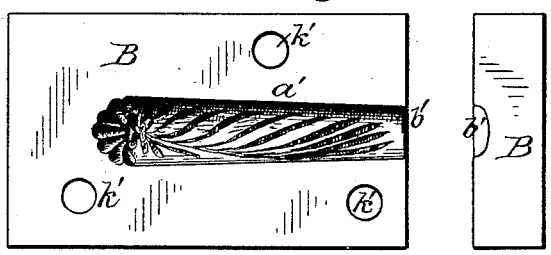

Figure 1 is a side view of one of my dies containing a knife and charged with composition ready for pressure. Fig. 2 is a top view of the base-piece of the die. Fig. 3 is a side view of the base-piece. Fig. 4 is an outer end view of the shut-off cap. Fig. 5 is a bottom and inner end view of said shut-off cap. Fig. 6 in bottom and end views illustrates the main cap. Fig. 7 is a longitudinal vertical section of the die as when occupied by a knife and with the handle-matrix charged with composition, the whole being under the platen of a press. Fig. 8 in two views illustrates a knife-blade with a tang suitable for receiving a composition handle. Fig. 9 illustrates a knife having such a handle as is applied in my dies. Fig. 10 in side view illustrates a base-piece of the die having a yielding cross-bar on which a portion of a bolster-seat is formed, as is sometimes used by me with fairly desirable results.

The die, as hereinbefore stated, consists of three main parts, the base A, the main cap B, and the shut-off cap C. These parts are composed of metal, and although I here show one single die, it is to be undestood that I prefer to have them in solid groups of dies, so that several knives can be simultaneously provided with handles.

In the base-piece A here shown there is one-half of a handle-matrix, $a$, one-half of a bolster-seat at $b$, and a bearing-seat, $c$, for receiving a knife-blade, $d$, flatwise, with its bolster $e$ in its seat and its tang $f$ centrally located in the handle-matrix.

The main cap B has one-half of the handle-matrix $a'$ and a portion of a bolster-seat at $b'$, and the parting-line between the main cap and the shut-off cap C is coincident with the usually sharp edge $e'$ of the bolster at its junction with the tang.

The shut-off cap C has a flat surface on its under side, $c'$, above the knife-blade or fork-shank seat at $c$, this latter being preferably so formed that when a shank or a blade lies flatly therein its upper side or surface will be flush with the top surface of the base at each side of said seat, and also parallel with said top surface, so that when the flat side $c'$ of the shut-off cap is forced downward it will not derange the already-adjusted tang. In the handle-matrix, at the end at which the shut-off cap abuts against the end of the main cap, there is a partial bolster-seat at $b^2$.

On top of the shut-off cap there is a heavy two-armed spring, $g$, which in one sense increases the thickness of the shut-off cap and makes it normally thicker than the main cap, in that when the parts are in position and the die charged and ready for compression, as shown in Fig. 1, the spring $g$ projects normally above the plane of the main cap, and therefore when the die is placed in a press and a platen, $h$, Fig. 7, is depressed (or the die raised) the spring is first engaged by the platen-surface, and thus develops a yielding shut-off cap which initially clamps the bolster without deranging the tang before the main cap is caused to operate effectively upon the composition $i$ within the handle-matrix, and hence the composition is shut off from passing over and upon the bolster. It is obvious that suitable guides must be provided for securing proper relations between the three main parts of the die, and this is well and cheaply accomplished by means of the dowel-pins $k$ and holes $k'$.

It will be seen that when a stiff semi-plastic mass of composition, or even a slightly-adhesive mealy compound, in proper quantity, is placed in the matrix in two portions—one below and one above a tang—and pressure is applied, the compound cannot escape laterally to any material extent, and hence it is well compressed but forced more or less toward the bolster of the knife and in close contact with those portions of the die which are coincident, or nearly so, with the sharp edge $e'$ of the bolster, thus securing a neat finish of the handle at that point, and during the compression the knife-blade is forced slightly in a longitudinal direction without objectionable results.

It will also be readily understood that the prior devices hereinbefore referred to for working semi-fluid celluloid are mere molds, and that my device is a true die which imparts to a mass of composition the form of handle desired and thoroughly solidifies it as a result of forcing the base and main cap together when the matrix is charged with a proper quantity of the compound, and this can be accurately determined after one or two compressions.

In some cases I have found it expedient to provide the base-piece, as shown in Fig. 10, with a transverse bar, $i$, backed up by springs, and to form bolster-seats thereon; but it is obvious that such variations constitute no departure from my invention.

Having thus described my invention, I claim as new and desire to secure by Letters Patent—

1. As a means for forming composition handles on table-knives and similar articles, a die consisting of a base-piece, a main cap, and a shut-off cap, and having a handle-matrix in and between said base and main cap, and also having a bolster-seat partly in the base-piece and partly in both the main cap and shut-off cap, the latter keeping the composition from passing from the matrix over the bolster, substantially as described.

2. The molding-die consisting of the base-piece and the main cap, having between them a handle-matrix closed at its outer end and a bolster-seat at its inner end, a bearing-seat for a blade or shank on said base-piece beyond the bolster-seat, and a yielding shut-off cap above said bolster-seat and normally projecting above the top of the main cap, substantially as described, whereby when a knife-blade having a tang is placed in position the handle-matrix of the die charged with composition, the shut-off cap applied, and the whole located in a press, said shut-off cap will be initially caused to clamp the bolster prior to the compression of the composition in forming a handle on the tang in said matrix.

ALANSON C. ESTABROOK.

Witnesses:
CHAS. O. PARSONS,
H. K. PARSONS.